United States Patent
Thoukydides et al.

(10) Patent No.: US 8,300,609 B2
(45) Date of Patent: Oct. 30, 2012

(54) ADAPTIVE SCHEDULING

(75) Inventors: Alexander Thoukydides, Cambridge (GB); Dean Armstrong, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 244 days.

(21) Appl. No.: 12/669,766

(22) PCT Filed: Jul. 18, 2008

(86) PCT No.: PCT/EP2008/059452
§ 371 (c)(1), (2), (4) Date: Jan. 19, 2010

(87) PCT Pub. No.: WO2009/013238
PCT Pub. Date: Jan. 29, 2009

(65) Prior Publication Data
US 2010/0182981 A1   Jul. 22, 2010

(30) Foreign Application Priority Data

Jul. 20, 2007   (GB) .................................. 0714246.6

(51) Int. Cl.
*H04J 3/00* (2006.01)
(52) U.S. Cl. ..................................................... 370/336
(58) Field of Classification Search .................. 370/203, 370/204–215, 229–240, 310–337, 338–350, 370/395.1, 395.3, 395.4, 395.41, 395.42, 370/395.5, 395.52, 395.53, 412–421, 431–529
See application file for complete search history.

(56) References Cited

U.S. PATENT DOCUMENTS

| | | | |
|---|---|---|---|
| 7,126,937 B2 * | 10/2006 | Crosbie et al. ................ | 370/350 |
| 7,233,602 B2 * | 6/2007 | Chen et al. .................... | 370/445 |
| 7,260,079 B1 * | 8/2007 | Chapman et al. ............. | 370/338 |
| 7,454,171 B2 * | 11/2008 | Palin et al. .................... | 455/41.2 |
| 7,706,396 B2 * | 4/2010 | Salo .............................. | 370/437 |
| 7,894,466 B2 * | 2/2011 | Pernu ............................ | 370/444 |
| 7,904,023 B2 * | 3/2011 | Viitamaki et al. ............ | 455/41.2 |
| 2002/0114303 A1 * | 8/2002 | Crosbie et al. ................ | 370/338 |
| 2002/0136233 A1 * | 9/2002 | Chen et al. .................... | 370/445 |
| 2005/0276241 A1 | 12/2005 | Kamerman et al. | |
| 2006/0194538 A1 * | 8/2006 | Palin et al. .................... | 455/41.2 |
| 2007/0066222 A1 | 3/2007 | Tao et al. | |
| 2007/0232358 A1 * | 10/2007 | Sherman ....................... | 455/560 |
| 2008/0253352 A1 | 10/2008 | Thoukydides et al. | |
| 2010/0322222 A1 * | 12/2010 | Desai ............................ | 370/338 |

* cited by examiner

*Primary Examiner* — Kwang B Yao
*Assistant Examiner* — Jung-Jen Liu
(74) *Attorney, Agent, or Firm* — Novak Druce DeLuca + Quigg LLP (57) ABSTRACT

A communication device arranged to communicate data with another device at a given time instant according to either a first communication protocol or a second communication protocol, the communication device being constrained to transmit data according to the first communication protocol during a transmission window of predetermined duration that commences at a predetermined time instant and being arranged to, in dependence on a data communication according to the second communication protocol to be made by the communication device during that transmission window, select a time instant in that same transmission window for commencing a data transmission according to the first communication protocol.

26 Claims, 4 Drawing Sheets

ADAPTIVE SCHEDULING

The invention relates to a communication device that is capable of transmitting data according to either a first network or a second network at a given time instant. For example, the communication device may have collocated radios and be capable of transmitting data via a Bluetooth connection and via a WLAN (wireless local area network) connection.

There are three main types of wireless network: wireless local area networks (WLAN), wireless personal area networks (WPAN) and wireless wide area networks (WWAN). A WWAN offers users a way to access data while away from home, the office or public access facilities. A WWAN could transmit data over a mobile phone network. A WPAN is implemented by wireless PAN devices communicating with each other over a wireless connection. Such devices typically have a range of up to 160 feet and may include Bluetooth™ devices such as mobile telephones, laptops and handheld devices. A WLAN has a range of up to 300 feet, and is commonly used in homes and offices and to provide general public access facilities.

Figure 1:
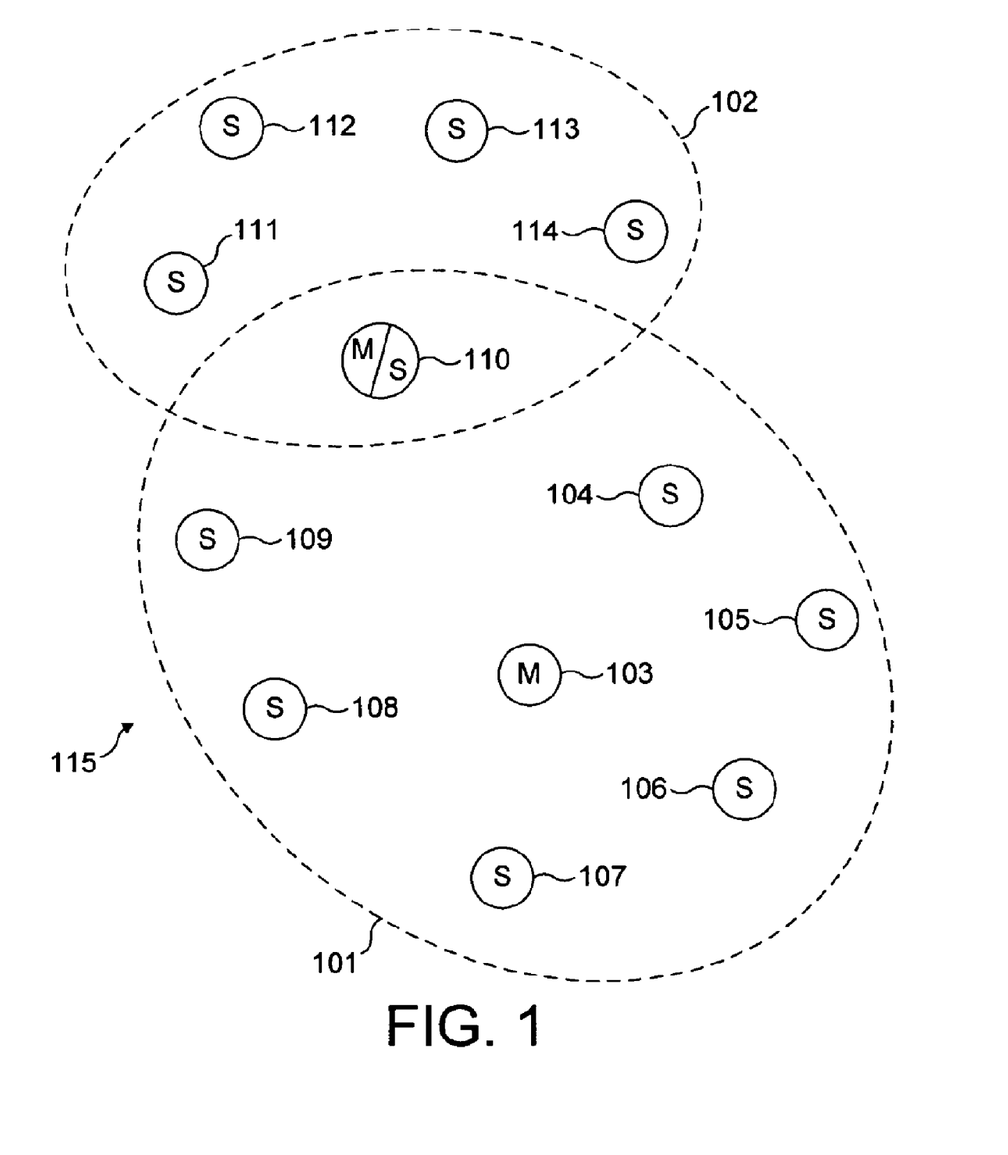
FIG. 1 shows a Bluetooth scatternet.

An example of a network according to the Bluetooth protocol is shown in FIG. 1. The network shown in FIG. 1 includes two piconets (101, 102) each of which include a master (103, 110) and several slaves (104 to 110 and 111 to 114). Each piconet can contain up to seven active slaves. All the Bluetooth modules within the same piconet are synchronised with the same clock, which they use to generate their frequency hopping sequences. The master is the device that initiates communication. The master also sets the clock and frequency hopping sequence for the piconet. At any given time, the master can transmit data to all active slaves in the piconet. The roles of master and slave are not fixed and either device can change roles to become the master at any time. A device may be a master in one piconet and a slave in another piconet (110). Similarly, a device may be a slave in more than one piconet. Interlaced piconets together form a scatternet (115).

In order to conserve battery life, Bluetooth defines three power-saving modes: sniff, hold and park mode. The only low power mode that is commonly used is sniff mode. Devices in sniff mode are permitted to transmit data back to the master when they are polled—a capability that is often used for user interface devices such as mice and keyboards. It is also possible to have an active audio link while in sniff mode, so that a device in sniff mode can take an active part in the piconet.

Bluetooth networks use a time-division multiplexing scheme to arrange transmissions between a master and its slaves. Data is transmitted in time slots, with the master typically transmitting data during even-numbered time slots and the slaves typically transmitting data during odd-numbered time slots. In addition, some time slots are used as broadcast and as logical channels for synchronisation and other control signals. Data transmissions can typically last for one, three or five time slots.

Figure 2:
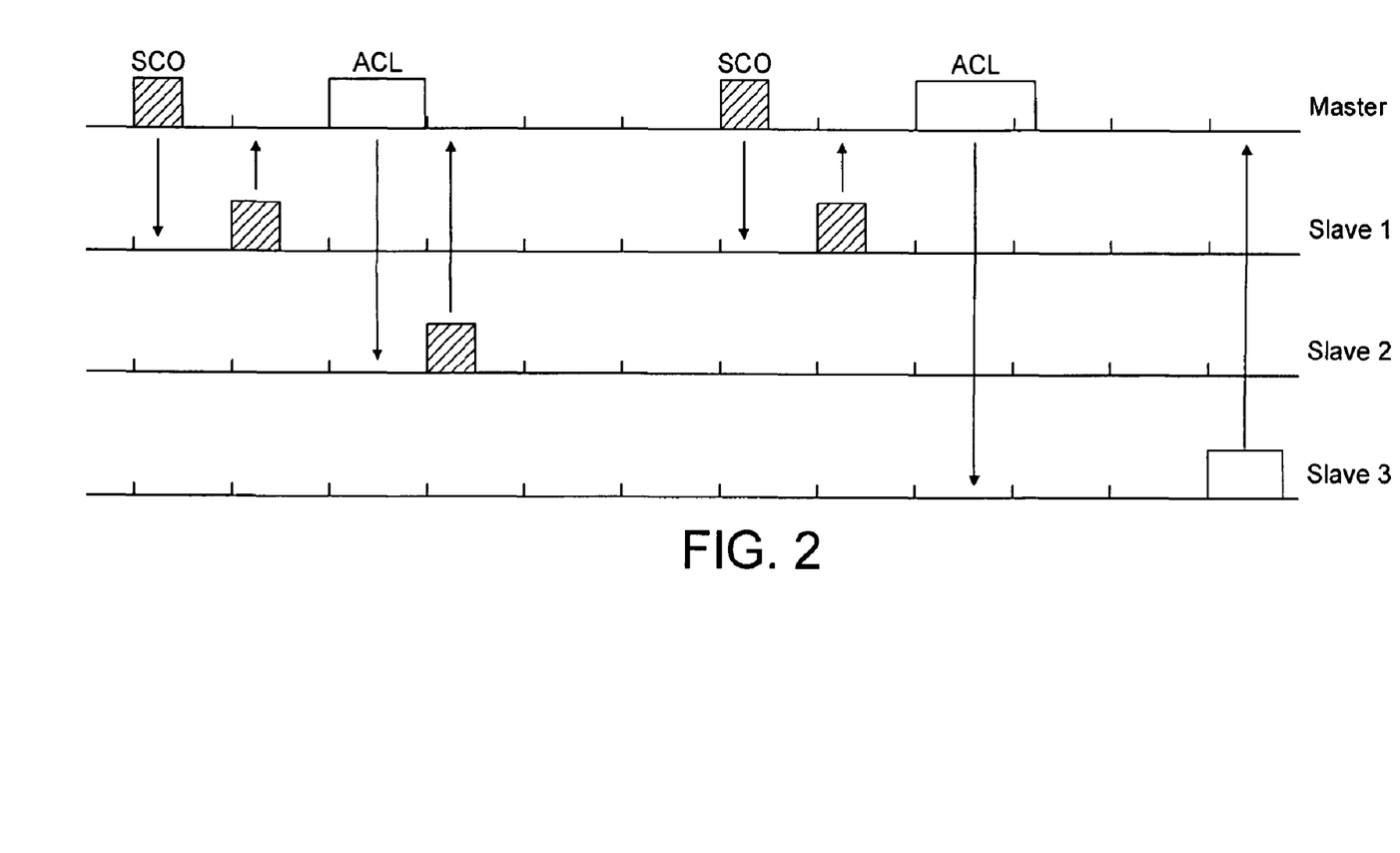
FIG. 2 shows transmission schedule for a Bluetooth piconet.

Two types of connection are often used between a master and a slave. The first of these is a synchronous connection oriented (SCO) connection and the second is an asynchronous connection oriented (ACL) connection. ACL and SCO are commonly known as "logical transports". SCO channels are circuit-switched and are typically used for transferring voice data. SCO channels are symmetrical between the master and the slave and use timeslots reserved at fixed intervals. ACL channels are packet-switched and provide an asynchronous connection between the master and slave. Typically (although not always) the slave can only transmit after having received a packet from the master and only in the next odd-numbered slot following the packet received from the master. The master may send polling packets to the slave if it has nothing more suitable to transmit. An example of a master transmitting data to three slaves using a combination of SCO and ACL connections is shown in FIG. 2.

Three other logical transports are also used. These are: Extended Synchronous Connection-Orientated (eSCO); Active Slave Broadcast (ASB); and Parked Slave Broadcast (PSB).

Slaves are permitted to transmit in SCO or eSCO reserved slots even if they have not received a packet from the master, as long as they did not receive a packet that was addressed to a different slave.

Bluetooth timeslots are 625 μs in duration. The start and end of each timeslot is determined by the clock of the master device. Therefore, each of the slave devices should be synchronised with the master clock. This can be achieved by the master sending data packets that include data representative of the state of its clock to each slave device during the paging procedure. Subsequently, each slave uses packets received from the master to resynchronise to the master clock, since the transmission of each packet commences at the start of a timeslot determined by the master clock.

It is increasingly common for communication devices to be capable of transmitting data over two different wireless networks. These networks may operate according to the same communications protocol or according to different communications protocols. Many devices are capable of transmitting data via more than one protocol. Such devices can, for example, be capable of transmitting data over a Bluetooth network and also over a WLAN.

One problem with devices that are capable of communicating data via more than one network is that frequently the device is only capable of communicating data successfully via one of those networks at a time. This may be because of interference between the information-bearing signals in the two networks or within the receiver circuitry; because some resource shared by the two network transceivers requires mutually exclusive access (for example, a single antenna that is switched between the two radios); or because of some other reason.

Interference between communications over the two different networks is particularly problematic if one or both of the protocols requires that a certain transmission is temporally aligned to begin at a given transmission instant. One such protocol is Bluetooth, which operates on a timeslot allocation scheme. As an illustrative example, a device that is capable of communicating data over a Bluetooth network and also over a WLAN may be forced to miss a timeslot for transmitting over the Bluetooth network in order to transmit data over the WLAN network. One particular situation in which this problem will arise is when a WLAN device is obliged to transmit acknowledgement messages according to an IEEE 802.11 protocol within a predetermined time of receiving the acknowledged data over the WLAN network.

Therefore, there is a need for an improved communication device that is capable of scheduling data communications according to different communication protocols.

According to one aspect of the invention, there is provided a communication device arranged to communicate data with another device at a given time instant according to either a first communication protocol or a second communication protocol, the communication device being constrained to transmit data according to the first communication protocol during a transmission window of predetermined duration that commences at a predetermined time instant and being arranged to, in dependence on a data communication according to the second communication protocol to be made by the communication device during that transmission window, select a time instant in that same transmission window for commencing a data transmission according to the first communication protocol.

The communication device may be capable of transmitting data according to the second communication protocol, the communication device being arranged to select a time instant for commencing data transmission according to the first communication protocol in dependence on a data transmission according to the second communication protocol to be made by the communication device.

The communication device may be arranged to select the time instant for transmitting data according to the first protocol in dependence on the duration of the data transmission according to the second protocol and/or the time instant at which the data transmission according to the second protocol was commenced.

The communication device may be arranged to select a time instant for commencing data transmission according to the first communication protocol in dependence on a data transmission according to the second communication protocol to which it is listening.

The communication device may be arranged to, when listening to a data transmission according to the second communication protocol, delay the data transmission according to the first communication protocol until the data transmission according to the second communication protocol has been completely received.

The communication device may be arranged to select the time instant for transmitting data according to the first protocol in dependence on the duration of the transmission according to the first protocol.

The communication device may be arranged to select the time instant for transmitting data according to the first protocol in dependence on the precision of a clock of the communication device.

The communication device may be arranged to select the time instant for transmitting data according to the first protocol to a receiving device in dependence on the time instant at which the communication device commenced a previous transmission according to the first communication protocol to that receiving device.

The communication device may be arranged to select a time instant for transmitting data according to the first communication protocol to a receiving device in dependence on a reception window during which that receiving device is arranged to decode data received from the communication device according to the first communication protocol.

The communication device may be arranged to communicate with a plurality of devices during transmission windows that are each associated with a respective one of the plurality of devices, the communication device being arranged to select a time instant for transmitting data according to the first protocol to one of the plurality of devices during a transmission window associated with that device to be compatible with the transmission windows associated with each of the others of the plurality of devices.

The communication device may be arranged to transmit data according to the first communication protocol in dependence on a clock of the communication device, the communication device being arranged to alter the clock in dependence on the time instant selected for transmitting data according to the first communication protocol. The communication device may be arranged to transmit data representative of the state of the altered clock to another device.

The communication device may be arranged to transmit data to another device according to the first communication protocol during transmission windows that occur at regularly spaced time intervals, the communication device being arranged not to transmit data to the other device during at least one of said regularly-spaced transmission windows in dependence on the data transmission to be made according to the second communication protocol.

The communication device may be arranged to commence the data transmission according to the first communication protocol at the end of the transmission window.

The communication device may be arranged to commence the data transmission according to the first communication protocol at the conclusion of the data communication according to the second communication protocol.

The communication device may be arranged to transmit data according to the first communication protocol in sequential transmission windows, the communication device being arranged to alter the time instant at which each transmission window commences in dependence on the data communication according to the second communication protocol and to transmit data according to the first communication protocol during the altered transmission windows.

The communication device may be arranged to determine the duration of the transmission window and/or the time instant at which the transmission window commences based on one or more of: the length of a time slot according to the first communication protocol, the time instant at which the transmission window commences according to the first communication protocol, the precision of a clock of the communication device, the accuracy of a clock of the communication device, a minimum clock precision permitted by the first communications protocol, a minimum clock accuracy permitted by the communications protocol and the length of a reception window during which a receiving device to which the data according to the first communications protocol is to be transmitted is arranged to decode data transmitted by the communication device according to the first communication protocol.

The communication device may be arranged to transmit data according to the first protocol at the selected time instant.

The first protocol may define a minimum clock precision for a clock of a communication device operable according to the first communication protocol and the communication device may comprise a clock having a higher precision than the minimum clock precision defined by the first protocol.

The communication device may be arranged to transmit data representative of one or more parameters associated with a clock of the communication device to another device. The one or more parameters may include the precision of the clock.

The communication device may be arranged to transmit data representative of a lower clock precision than the actual precision of the clock of the communication device to the other device.

The communication device may be arranged to transmit data representative of the minimum clock precision defined by the first communication protocol to the other device.

According to a second aspect of the invention, there is provided a method for scheduling data communications in a communication device that is capable of communicating data with another device at a given time instant according to either a first communication protocol in which transmission windows are allocated for transmitting data or a second communication protocol, the communication device being constrained to transmit data according to the first communication protocol during a transmission window of predetermined duration that commences at a predetermined time instant, the method comprising determining that a data communication according to the second communication protocol is to be made by the communication device during a transmission window allocated for transmitting data according to the first communication protocol, selecting a time instant during that transmission window for commencing a data transmission according to the first communication protocol in dependence on the data communication according to the second communication protocol and transmitting data according to the first communication protocol at the selected time instant.

According to a third aspect of the invention, there is provided a communication device capable of communicating data by means of a communication protocol according to which a transmitting device is constrained to transmit data during a transmission window of predetermined duration that commences at a predetermined time value of a local clock of the transmitting device and according to which the communication device should listen for a transmission from the transmitting device during a receive window of predetermined duration that commences before the transmission window at a predetermined time value of a local clock of the communication device, the communication device being arranged not to listen for a transmission from the transmitting device during at least part of the receive window, the length of the said part being determined in dependence on the precision of the local clock of the communication device.

The communication device may be arranged not to listen for a transmission from the transmitting device during a part of the receive window that does not overlap with the transmitter window.

The communication device may be arranged to transmit data during the part of the receive window in which it is not listening for a transmission from the transmitting device.

The communication device may be arranged to transmit data by means of the communication protocol during the part of the receive window in which it is not listening for a transmission by the transmitting device.

The communication device may be capable of communicating data according to two different communication protocols, the communication device being arranged to listen for a transmission transmitted by means of a first one of the protocols and being arranged to transmit data according to a second one of the protocols during the part of the receive window in which it is not listening for a transmission by the transmitting device.

The communication device may be arranged to reconstruct the data transmitted by the transmission device using only those signals received by the communication device during the time for which the device was listening for the transmission by the transmitting device.

The first communication protocol may be Bluetooth. The second communication protocol may be a wireless local area network protocol or a wireless wide area network protocol.

According to a fourth aspect of the invention, there is provided a method for scheduling data communications in a communication device capable of communicating data by means of a communication protocol according to which a transmitting device is constrained to transmit data during a transmission window of predetermined duration that commences at a predetermined time value of a local clock of the transmitting device and according to which the communication device should listen for a transmission from the transmitting device during a receive window of predetermined duration that commences before the transmission window at a predetermined time value of a local clock of the communication device, the method comprising not listening for a transmission from the transmitting device during at least part of the receive window, the length of the said part being determined in dependence on the precision of the local clock of the communication device.

The present invention will now be described by way of example with reference to the accompanying drawing. In the drawings.

According to certain embodiments of the invention, a communication device is capable of transmitting data over two different networks. One of the networks operates according to a first communication protocol and the other of the networks operates according to a second communication protocol. The two protocols could be the same or different. The device is capable of transmitting/receiving data successfully over only one of the networks at a time. For example, the device may include only one antenna, which two different radios are obliged to share. Alternatively, each radio in the device may be provided with its own antenna, but communications via the two radios may interfere if they transmit via their respective antennas at the same time or if one radio is transmitting at the same time as the other antenna is receiving.

The communication device may be capable of predicting when communications via two different networks are likely to interfere. Interference is typically predicted based on knowledge of which activity types and parameters are likely to interfere (e.g. transmit/receive, spectral occupancy, power level, required signal-to-noise ratio), knowledge of the protocols used by the two networks and the respective timing information for communications via the two networks. Timing information and signal parameters for the two protocols may be communicated between the two transceivers, typically through hardware coexistence signalling.

One of the protocols that the communication device is capable of using may require data communications to occur during specified time slots. For example, a certain transmission may be required to start at a specific time instant with the protocol defining a corresponding receiver window to assist the receiving device to receive the transmission. The receiver window may incorporate some specified tolerance for error caused by timing inaccuracies due to process, temperature or other variations across the multiple communication devices operating in the network.

The communication device is advantageously arranged to select a specific time instant during a transmission window specified by the first communication protocol to commence transmitting data according to that protocol. This enables the device to schedule a data transmission according to one protocol so as to accommodate a data communication according to the other protocol. Therefore, rather than missing its timeslot because of a transmit or receive operation over the other network, the device is able to "nudge" a data transmission within its designated transmission window so that both data communications can be accommodated.

The communication device may be arranged to select the time instant for transmission in such a way that the transmission is least likely to temporally overlap with activity on the other network. One option is for the transmission to be initially scheduled for the earliest possible time instant within the transmission window and then to be deferred until the last possible moment in the transmission window if necessary, in order to avoid interfering with communications on the other network.

The communication device may 'nudge' the transmission according to the first protocol in either direction, i.e. the communication device may select to commence transmission either before or after it was scheduled to do so.

Embodiments of the invention are particularly suitable for implementation in devices that are capable of operating over Bluetooth networks. For a better illustration of the invention, various examples are described below with reference specifically to devices that are capable of operating over Bluetooth and/or WLAN networks. However, this is for the purpose of example only and it should be understood that embodiments of the invention are not restricted to any particular communication protocol. For example, embodiments of the invention may also be advantageously implemented in respect of other TDMA (Time Division Multiple Access) protocols or protocols such as CSMA (Carrier Sense Multiple Access), CDMA (Code Division Multiple Access) etc.

Figure 3:
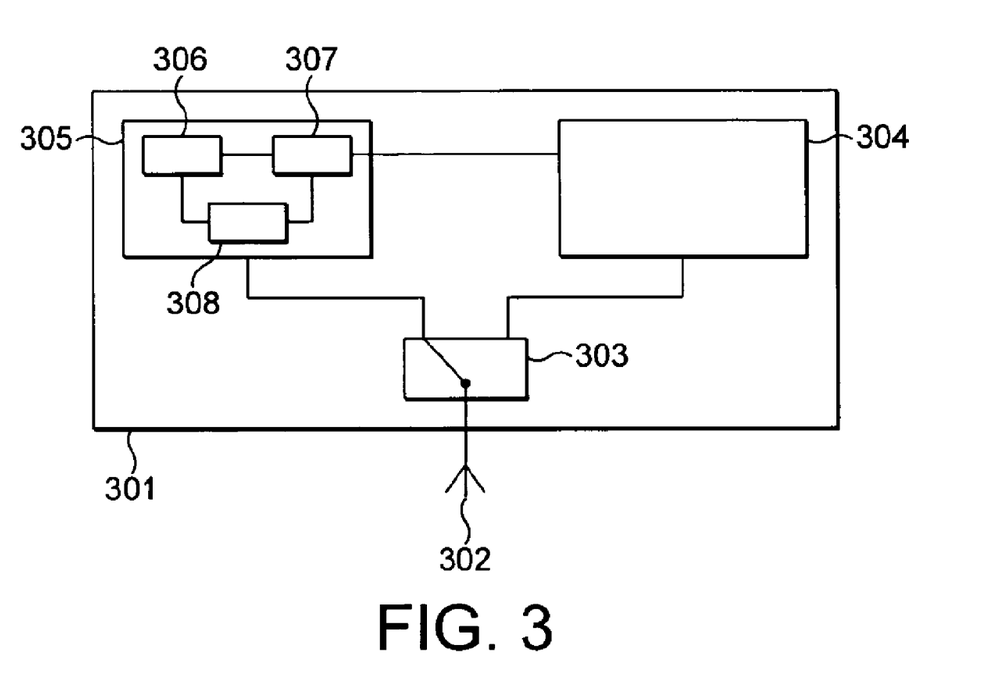
FIG. 3 shows a communication device according to one embodiment of the invention.

FIG. 3 shows a communication device according to certain embodiments of the invention. This is for the purposes of example only and it should be understood that the communication devices according to embodiments of the invention are not limited to any specific implementation.

An example of a communication device is shown in FIG. 3. The device 301 comprises an antenna 302 that is connected via a switching unit 303 to one of two radio units (first radio unit 305 and second radio unit 304). Each of the radio units is capable of generating data to be transmitted by the antenna according to a particular communication protocol. The first radio unit 305 is shown as further comprising a clock unit 306, a control unit 307 and a transmit/receive unit 308. Similar functional units may also be included in the second radio unit 304, although this is not shown in the figure.

In FIG. 3 separate functional units for performing each different function are shown. However, the various operations performed by each device could be divided differently between these functional units. Also, the functional units need not be implemented in separate blocks, as shown in the figure. In particular, one central control unit might be provided for controlling operation of both the radio units.

The control unit shown in FIG. 3 is preferably arranged to control operations of first radio unit 305, e.g. controlling the generation of data to be transmitted by the transmission unit. As the control unit shown in FIG. 3 is located in the first radio unit, it is preferably able to communicate with the second radio unit so that it knows when the other radio unit has data to transmit via the other communication protocol, the time when that transmission is due to commence, the likely duration of that transmission etc. The control unit may also know when the other radio unit is receiving data, when that data is completely received and the scheduling of any data it is anticipated will be received in the future. Alternatively, this information may be provided by a central controller/scheduler that knows when both radio units have data to communicate. Such a central controller/scheduler may assess the transmission priorities of the different radio units and determine which radio unit should be permitted to communicate its data at each particular time instant. The communication of data encompasses both receiving and transmitting data.

The control unit is preferably capable of selecting a transmission time for data generated by the transmission unit. This transmission time is first selected in dependence on the time slot which has been allocated to the transmission by the first protocol (e.g. in dependence on the intended recipient if the first protocol is Bluetooth). This transmission time may then need to be adjusted in dependence on data to be communicated according to the second protocol (i.e. the data to be transmitted or received by the second radio unit) during the transmission window allocated for transmissions according to the first protocol.

The control unit may pass the time that is finally selected for transmitting data according to the first communication protocol to the transmission unit, so that it can submit its data to the antenna at the appropriate time. The control unit may be capable of controlling the operation of the switching unit, either directly or via some other functional unit, e.g. a central controller/scheduling unit responsible for determining which of the radio units should be allowed to transmit data at any one time.

The clock signal generated by the clock unit determines the start of each time slot. In addition to knowing the start of each time slot, the control unit may be arranged to track the maximum transmission window for sending data according to the first communication protocol. The transmission window may be the same as an allocated time slot or different from an allocated time slot. The control unit selects a time instant for commencing transmission according to the first communication protocol that is within the transmission window.

The way in which the control unit determines the transmission window may be dependent on the protocol. Some protocols define that a communication device should start transmitting data at the start of a time slot. The receiving device is then arranged to listen for the transmission at the start of the time slot. Because of clock inaccuracies, it is possible that the receiving device would miss the start of the transmission if it listened only for the designated time instant when that transmission was due to start. Therefore, the protocol may require the receiver to listen for the transmission during a receiver window. The receiver window may suitably be centred on a time instant at which transmission should ideally be commenced if both devices had a completely accurate clock with a 'window' on either side to allow for inevitable clock inaccuracies. This 'window' may incorporate a transmitter tolerance to allow for differences between the transmitter's clock and absolute time and a receiver tolerance to allow for differences between the receiver's clock and absolute time.

Other protocols permit a device to commence transmission at any time during a designated time slot. In such protocols, the receiver window may be at least as long as the time slot. The receiver window may also be extended beyond the length of the time slot to incorporate tolerances for clock inaccuracies in a similar way to that described above. For devices operating according to protocols that permit transmission to commence at any time during the time slot, the clock signal may also be used to determine the end of each time slot. Embodiments of the invention are equally applicable to either type of transmission window.

In general, the maximum transmission window can be considered as representing the longest possible time during which the communication device can send data according to the first communication protocol while still meeting the protocol requirements set down in the relevant telecommunications standards. These requirements include limitations on clock drift and instantaneous timing.

In selecting a suitable time instant for commencing transmission the communication device may consider the length of the receiver window. The communication device may be arranged to exploit differences between its clock and the clock requirements set out in the relevant communications standard to determine a maximum window within which it can transmit while still ensuring that the receiving device will start to receive the transmission during the specified receiver window. The tolerances incorporated into the receiver window to allow for clock inaccuracies can be a significant factor in enabling the communication device to 'nudge' transmissions.

The accuracy and precision of the clock signal generated by the clock unit may be used by the communication device to determine the maximum transmission window. Precision is an inherent quality of any clock and refers to the exactness of the clock (e.g. the amount by which the clock 'drifts' from an absolute time per unit time). The clock accuracy refers to the degree of correctness of the clock and is likely to change with time as a result of clock drift.

Telecommunications standards frequently define an acceptable clock precision and clock accuracy. Different requirements may be specified for different modes of operation. For example, Bluetooth normally permits a maximum clock drift of 20 ppm but this is increased during low power modes of operation to 250 ppm. A communication device may advantageously have more than one clock, so that a less precise clock with reduced power requirements can be used during low power modes of operation when a decreased clock precision may be permitted by the relevant protocol.

The communication device may include a clock that is more precise that the minimum clock precision specified in the relevant telecommunications standard associated with the first communications protocol. Having a more precise clock assists the communication device to 'nudge' transmissions.

As an example, a Bluetooth device operating in 'sniff' mode and having a 'sniff' interval $T_{sniff}$ of one second has a transmission window that is extended by ±250 μs. However, if the device has a clock that drifts less than the 250 ppm defined in the Bluetooth standard, its clock will be closer to absolute time than the ±250 μs predicted by the standard. If the clock has a precision of 100 ppm, so that it will only be ±100 μs away from absolute time after a sniff interval of one second, this gives the device ±150 μs within which it can 'nudge' a Bluetooth transmission while still meeting the absolute timing bounds set out by the Bluetooth protocol.

The receiver window may also include a receiver tolerance. The communication device may be able to further extend the maximum transmission window by exploiting differences between the receiver's clock and the clock requirements set out in the relevant standard. The communication device may estimate the clock precision and accuracy of the receiving device's clock by assuming that these values are similar to those of its own clock. Alternatively, the communication device may estimate the accuracy and precision of the receiving device's clock based on data received from that device.

Typically, the greater the precision and accuracy of the transmitting device's clock, the longer the maximum transmission window with respect to that clock. This is because most communications protocols define a minimum clock accuracy required of a communication device. The transmission windows account for this allowable inaccuracy. Hence, the absolute timing of the transmission window is independent of the clock accuracy of the transmitting device. If the transmitting device knows that its clock is more accurate than required by the standard then it can use a larger transmission window with respect to that clock without falling outside of the absolute timing bounds set by the standard.

If the second radio unit shown in FIG. 3 has data that must be transmitted, so that the first radio unit is obliged to delay its own data transmissions, the first radio unit may be arranged to transmit its data as soon as the second radio unit has finished its transmission. Alternatively, transmissions according to the first communication protocol may initially be scheduled for the earliest time instant within the transmission window and simply delayed until the last possible time instant within the transmission window if there is data that must be transmitted according to the second communication protocol.

The data transmission according to the first communication protocol may continue until it is completed. However, if the first protocol limits a transmission to the duration of a time slot, the communication device may consider the end of the time slot when selecting a suitable time instant for commencing transmission so that the transmission does not exceed the designated time slot.

A specific implementation of a communication device according to one embodiment of the invention will now be described with reference to an example in which the communication device is capable of transmitting data over a Bluetooth network (so that Bluetooth is the first communication protocol) and a WLAN network (so that IEEE 802.11 is the second communication protocol). This is for illustrative purposes only and it should be understood that the present invention is not limited to any specific protocols or types of communication network. In particular, it should be understood that the preferred features of the invention described below are not limited to implementations in which the first protocol is Bluetooth and/or the second protocol is IEEE 802.11.

Figure 4:
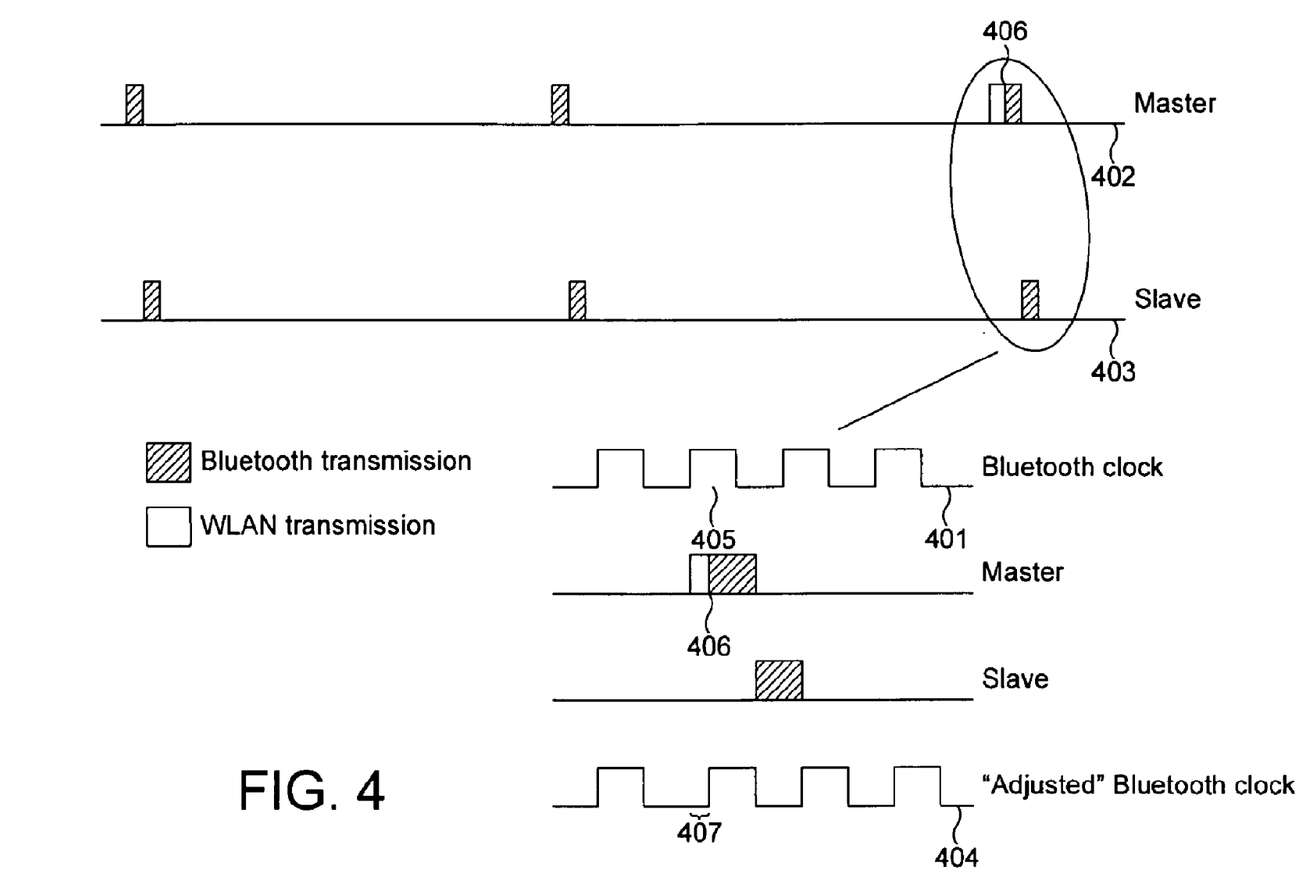
FIG. 4 shows a master and slave exchanging Bluetooth data according to one embodiment of the invention.

FIG. 4 shows a Bluetooth clock signal 401, transmissions made by a master 402, transmissions made by a slave 403 and an altered Bluetooth clock signal 404. Only one slave is shown in the figure for reasons of simplicity. As explained above, the master of a Bluetooth piconet will commonly exchange data with more than one slave.

Bluetooth devices operating as master may change the slot timing within the allowable bounds on any slot in which they transmit. In the figure, the master is shown transmitting data to the slave in time slots that are determined by the Bluetooth clock. The Bluetooth clock in the figure is the clock of the master, since it is the master's clock that determines the start and end point of each time slot and the frequency hopping sequence. Different amounts of data may be transmitted in each time slot and transmission need not last an entire slot, although this is often the case. Similarly a single packet may be transmitted across as many as five time slots.

The slave in FIG. 4 is operating in 'sniff' mode. Therefore, although the slave may listen to the master's transmissions it will tend to do so on a relatively infrequent basis. The benefit of having a device in sniff mode is that Bluetooth allows for an increased receiver window that the master can exploit. For a device in sniff mode that has not synchronised for at least 250 ms, the Bluetooth protocol currently defines a receiver window that is at least equal to the sniff interval multiplied by an allowable clock drift of 250 ppm (±10 μs jitter).

In one time slot 405, the master is obliged to transmit data over the WLAN network. The master therefore selects a time instant 406 during that time slot that is suitable for transmitting the Bluetooth data. The slave receives the Bluetooth time slot and assumes that the start of this data is the start of the time slot. The slave therefore adjusts its Bluetooth clock to form the altered Bluetooth clock, i.e. the slave resynchronises to the delayed transmission (407). Thereafter, the slave transmits its data to the master according to the adjusted Bluetooth clock. The master similarly transmits its data according to the adjusted Bluetooth clock. Therefore, the selection of a suitable time instant for transmitting the Bluetooth data so as to accommodate the WLAN data can be considered as a shift in the Bluetooth clock. As this shifted Bluetooth clock is adopted by the slave and used to determine when to listen for transmissions from the master, the shifted Bluetooth clock should also be adopted by the master.

Typically the clock of a Bluetooth unit is not itself adjusted, and slaves synchronise with the master clock by maintaining a clock offset value that indicates the difference between the master's clock and their own. This clock offset value may be adjusted to reflect the delayed transmission of the Bluetooth data of the master, so that the slave is effectively forming the altered Bluetooth clock shown in FIG. 4. The master may equally maintain a clock offset between its actual clock and the "altered Bluetooth clock" that it has effectively formed by delaying transmission of Bluetooth data to accommodate WLAN data.

The master may maintain the altered Bluetooth clock for subsequent transmissions (as shown in FIG. 4). The adjusted clock then becomes the new Bluetooth clock. Any changes to the new clock are subject to the same restrictions that applied to the adjustment of the original clock.

Although FIG. 4 shows the master nudging a Bluetooth transmission to accommodate another transmission, it should be understood that embodiments of the invention are equally applicable to nudging a transmission to allow a signal to be received and decoded by the device.

A device acting as a master should consider several factors when effectively altering the Bluetooth clock to accommodate a transmission according to a different protocol, including:

The clock should be altered taking into account when the last transmission to the slave in question took place, the clock accuracy of the master, and the clock accuracy assumed of the master by the slave, since that sets a limit on the potential drift. For example, if t=time since the last transmission to the slave, a=the maximum percentage clock drift that is permitted by the relevant communications standard per unit time (i.e. the clock drift that can be assumed for the slave), b=the maximum percentage clock drift per unit time that the master's clock is subject to, $j_a$=the allowable jitter permitted by the standard and $j_b$=the actual jitter of the master's clock, then the amount T by which the clock can be altered is given by:

$$T = \frac{(a-b)}{100}t + 2(j_a - j_b)$$

If the clock jitter is taken into account in order to further extend the maximum transmission window (as in the equation above), then the behaviour required of the communication device can become more complicated. For example, both the jitter and the maximum clock drift may be taken into account to "nudge" a transmission. However, the "adjusted" Bluetooth clock resulting from the nudged transmission should contain only adjustments arising from differences between the actual clock accuracy and the clock accuracy specified by the standard. The adjusted clock should not incorporate an allowance for differences between the actual clock jitter and the allowable jitter specified by the standard.

If the Bluetooth master is communicating with multiple slaves then the clock shift needs to be compatible with all of them. Therefore, the master should consider when it is next scheduled to transmit to each of the other slaves with which it is communicating, and the extent to which those transmissions can be shifted while still ensuring that they will be received during the slaves' receiver windows. The estimated clock accuracies of those multiple slaves may also be considered.

A communication device operating according to the Bluetooth protocol may be arranged to request another device's clock precision and/or accuracy. For example, one device may send an LMP_timing_accuracy_req message to request the parameters of another device's clock. That device may respond with an LMP_Timing_accuracy_res message including the worst case drift (the maximum and default value is 250 ppm) and jitter (the maximum and default value is 10 μs). If a master is using 'clock fudging', it may respond to a timing request message with the maximum permitted performance parameters even though its clock is more precise than this. This enables the master to extend the maximum transmission window by ensuring that the slave will listen for its transmission during the longest possible receiver window.

Bluetooth devices operating in Sniff and Park modes will tend to allow a greater degree of timing flexibility. This is due to the relative infrequency of their interactions with the master, which means that their receiver windows are typically longer than for active devices to compensate for the length of time since they last synchronised with the master. A master may choose to skip some of the transmissions that it would otherwise send in order to restrict the accuracy of the slave's synchronisation, and therefore increase the maximum transmission window. Skipping transmissions has the effect of increasing latency and reducing throughput. These disadvantages need to be weighed against the coexistence benefits of allowing more flexible scheduling. In practice, the decision as to whether to skip transmissions is likely to be made based on the quality of service (QoS) requirements of the applications running over both protocols.

The master may determine the separation between transmissions to a particular slave so as to restrict the accuracy of a slave's synchronisation. For example, rather than transmitting a certain amount of data over two separated time slots, the master may decide to transmit the same data over two neighbouring time slots so as to maximise the time between transmissions to the slave and so restrict the accuracy of the slave's clock.

In order that the master can accurately determine the maximum transmission window, it should preferably estimate how the slave's receiver windows will lengthen to account for infrequent synchronisation with the master. The master may use the maximum acceptable clock "slippage" or drift specified in the relevant telecommunications standard. The master may also use the length of time that has passed since it last transmitted Bluetooth data to the slave when estimating the likely length of the slave's reception window.

Embodiments of the invention are especially suitable for accommodating transmission of IEEE 802.11 ACKs (acknowledgement messages), since these acknowledgement messages are fairly short (approximately 30 μs) in comparison with a Bluetooth receiver window so there is a good chance that minimal clock shift will be needed to allow those signals to be sent on time. Bluetooth receiver windows are ±10 μs for a slave that last synchronised less than 250 ms previously. For longer intervals since the slave's last synchronisation, the receiver window is given by $\pm(T \times 250 \times 10^{-6} + 10)$ μs, where T is the length of time in seconds since the slave's last synchronisation.

The embodiments described above refer to a communication device selecting a time instant for transmission by 'nudging' the transmission within the transmission window. However, the 'nudging' principle may also be used by the communication device when receiving. The device may can reduce the receive window with respect to its own dock to more closely match the absolute timing bounds if it has a more accurate clock than specified in the relevant standard.

For example, rather than listening for a transmission from a transmitting device during the entirety of the receive window, the device may exploit that part of the receive window that is allocated to allow for inaccuracies in its own clock to reduce the length of time for which it listens for a transmission. This may be done in dependence on the precision of the device's local clock. The part of the receive window for which the device is not listening for transmissions can then be used to transmit data. Such transmissions would tend to interfere with the received signal if the two coincided. However, since the device has a more accurate clock than is required, the device is capable of determining a part of the receiver window that can be safely used for transmitting data without risk of interference.

The part of the receive window during which the device does not listen for transmissions from a transmitting device is suitably a part of the window that does not overlap with the transmitter window. This helps to ensure that the receiver does not miss the start of the transmission.

The communication device may be arranged to reconstruct the data sent by the transmitting device using any signals it receives while listening for that transmission (e.g. by decoding the received signal). Any signals received during the time that it is not 'listening' are not used in the reconstruction.

The communication device may be arranged to 'nudge' the receiver window to allow it to transmit data by means of the same protocol or by means of a different protocol from the protocol that has defined the receiver window.

A communication device that is arranged to 'nudge' a receiving operation may incorporate the same features as a device that is capable of 'nudging' a transmission. Some of these features, which are described in detail above, are equally applicable to nudging a receiver operation as to nudging a transmission.

Embodiments of the invention may suitably be implemented in a wide range of communication devices, including mobile phones, PDAs, digital cameras, laptop computers etc.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features. In view of the foregoing description it will be evident to a person skilled in the art that various modifications may be made within the scope of the invention.

The invention claimed is:

1. A communication device arranged to communicate data with another device at a given time instant according to either a first communication protocol or a second communication protocol, the communication device being constrained according to the first communication protocol to transmit data during a time slot allocated to that transmission, said time slot having a predetermined duration and commencing at a predetermined time instant, the communication device comprising a control unit arranged to:

determine a transmission window associated with the allocated time slot, the transmission window being different from the allocated time slot and representing a time within which the communication device can transmit the data while still meeting the constraints of the first communication protocol to transmit that data in the allocated time slot;

select a time instant in the transmission window for commencing transmission of the data according to the first communication protocol so as to accommodate a data communication according to the second communication protocol that is to be made by the communication device during the allocated time slot; and wherein the communication device is arranged to transmit data representative of one or more parameters associated with a clock of the communication device to another device.

2. A communication device as claimed in claim 1, wherein the communication device is arranged to select the time instant for transmitting data according to the first protocol in dependence on the duration of the data transmission according to the second protocol.

3. A communication device as claimed in claim 1, wherein the communication device is arranged to select the time instant for transmitting data according to the first protocol in dependence on the time instant at which the data transmission according to the second protocol was commenced.

4. A communication device as claimed in claim 1, wherein the communication device is arranged to select a time instant for commencing data transmission according to the first communication protocol in dependence on a data transmission according to the second communication protocol to which it is listening.

5. A communication device as claimed in claim 4, wherein the communication device is arranged to, when listening to a data transmission according to the second communication protocol, delay the data transmission according to the first communication protocol until the data transmission according to the second communication protocol has been completely received.

6. A communication device as claimed in claim 1, wherein the communication device is arranged to select the time instant for transmitting data according to the first protocol in dependence on the duration of the transmission according to the first protocol.

7. A communication device as claimed in claim 1, wherein the communication device is arranged to select the time instant for transmitting data according to the first protocol in dependence on the precision of a clock of the communication device.

8. A communication device as claimed in claim 1, wherein the communication device is arranged to select the time instant for transmitting data according to the first protocol to a receiving device in dependence on the time instant at which the communication device commenced a previous transmission according to the first communication protocol to that receiving device.

9. A communication device according to claim 1, wherein the communication device is arranged to select a time instant for transmitting data according to the first communication protocol to a receiving device in dependence on a reception window during which that receiving device is arranged to decode data received from the communication device according to the first communication protocol.

10. A communication device as claimed in claim 1, wherein the communication device is arranged to communicate with a plurality of devices during transmission windows that are each associated with a respective one of the plurality of devices, the communication device being arranged to select a time instant for transmitting data according to the first protocol to one of the plurality of devices during a transmission window associated with that device to be compatible with the transmission windows associated with each of the others of the plurality of devices.

11. A communication device as claimed in claim 1, wherein the communication device is arranged to transmit data according to the first communication protocol in dependence on a clock of the communication device, the communication device being arranged to alter the clock in dependence on the time instant selected for transmitting data according to the first communication protocol.

12. A communication device as claimed in claim 11, wherein the communication device is arranged to transmit data representative of the state of the altered clock to another device.

13. A communication device as claimed in claim 1, wherein the communication device is arranged to transmit data to another device according to the first communication protocol during transmission windows that occur at regularly spaced time intervals, the communication device being arranged not to transmit data to the other device during at least one of said regularly-spaced transmission windows in dependence on the data transmission to be made according to the second communication protocol.

14. A communication device as claimed in claim 1, wherein the communication device is arranged to commence the data transmission according to the first communication protocol at the end of the transmission window.

15. A communication device as claimed in claim 1, wherein the communication device is arranged to commence the data transmission according to the first communication protocol at the conclusion of the data communication according to the second communication protocol.

16. A communication device as claimed in claim 1, wherein the communication device is arranged to transmit data according to the first communication protocol in sequential transmission windows, the communication device being arranged to alter the time instant at which each transmission window commences in dependence on the data communication according to the second communication protocol and to transmit data according to the first communication protocol during the altered transmission windows.

17. A communication device as claimed in claim 1, wherein the communication device is arranged to determine the duration of the transmission window and/or the time instant at which the transmission window commences based on one or more of: the length of a time slot according to the first communication protocol, the time instant at which the transmission window commences according to the first communication protocol, the precision of a clock of the communication device, the accuracy of a clock of the communication device, a minimum clock precision permitted by the first communications protocol, a minimum clock accuracy permitted by the communications protocol and the length of a reception window during which a receiving device to which the data according to the first communications protocol is to be transmitted is arranged to decode data transmitted by the communication device according to the first communication protocol.

18. A communication device as claimed in claim 1, wherein the communication device is arranged to transmit data according to the first protocol at the selected time instant.

19. A communication device as claimed in claim 1, wherein the first protocol defines a minimum clock precision for a clock of a communication device operable according to the first communication protocol, the communication device comprising a clock having a higher precision than the minimum clock precision defined by the first protocol.

20. A communication device as claimed in claim 1, wherein the one or more parameters include the precision of the clock.

21. A communication device as claimed in claim 1, wherein the first protocol defines a minimum clock precision for a clock of a communication device operable according to the first communication protocol, the communication device comprising a clock having a higher precision than the minimum clock precision defined by the first protocol, and the communication device is arranged to transmit data representative of one or more parameters associated with a clock of the communication device to another device, the one or more parameters including the precision of the clock, and the communication device is arranged to transmit data representative of a lower clock precision than the actual precision of the clock of the communication device to the other device.

22. A communication device as claimed in claim 21, wherein the communication device is arranged to transmit data representative of the minimum clock precision defined by the first communication protocol to the other device.

23. A method for scheduling data communications in a communication device that is capable of communicating data with another device at a given time instant according to either a first communication protocol or a second communication protocol, the communication device being constrained according to the first communication protocol to transmit data during a time slot allocated to that transmission, said time slot having of a predetermined duration and commencing at a predetermined time instant, the method comprising:

determining a transmission window associated with the allocated time slot, the transmission window being different from the allocated time slot and representing a time within which the communication device can transmit the data while still meeting the constraints of the first communication protocol to transmit that data in the allocated time slot;

selecting a time instant during that transmission window for commencing transmission of the data according to the first communication protocol so as to accommodate a data communication according to the second communication protocol that is to be made during the allocated time slot; transmitting the data according to the first communication protocol at the selected time instant; and wherein the communication device is arranged to transmit data representative of one or more parameters associated with a clock of the communication device to another device.

24. A communication device as claimed in claim 1, wherein the first communication protocol is Bluetooth.

25. A communication device as claimed in claim 1, wherein the second communication protocol is a wireless local area network protocol.

26. A communication device as claimed in claim 1, wherein the second communication protocol is a wireless wide area network protocol.

* * * * *